Aug. 27, 1963    W. L. HUNTER    3,101,619
SAMPLING APPARATUS
Filed Oct. 24, 1960
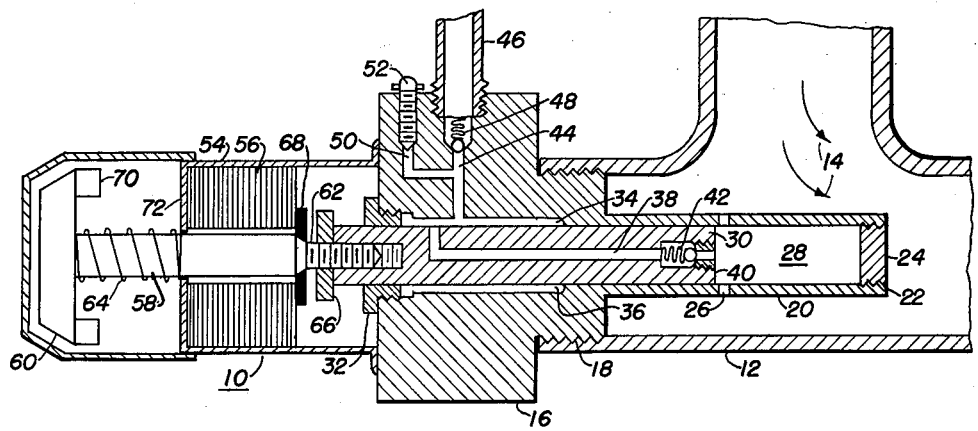
FIG. 1
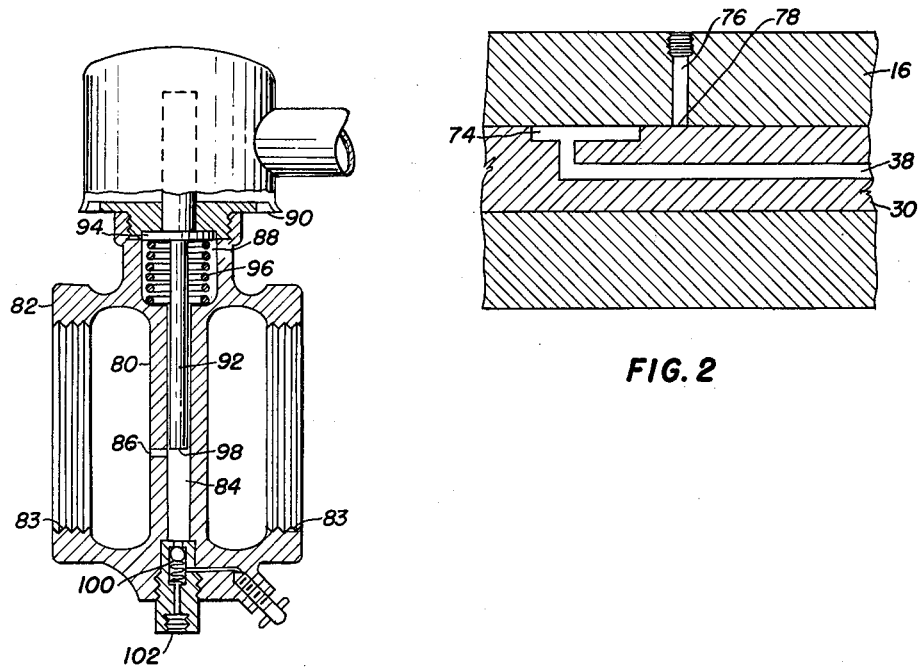
FIG. 2
FIG. 3
INVENTOR.
BY WESLEY L. HUNTER
*Edward H. Jung*
ATTORNEY.

3,101,619
SAMPLING APPARATUS
Wesley L. Hunter, Arlington Heights, Ill., assignor to The Pure Oil Company, Chicago, Ill., a corporation of Ohio
Filed Oct. 24, 1960, Ser. No. 64,373
8 Claims. (Cl. 73—422)

This invention relates to fluid samplers, and particularly to fluid samplers for removing small quantities of liquids contained in pipelines and other conduits. In many fields of technology, it is desirable and necessary to obtain a sample from a flowing fluid stream which is representative of the material which comprises the stream. A particular application is that of sampling crude oil which is travelling through a collecting network and into a custody transfer system. It is necessary to continually sample the flowing stream in order to determine the composition of the liquid transferred. It is common in oil field installations to provide a fluid sampler so that periodically a small quantity of oil is collected from the flowing stream.

A number of problems arise in samplings of this type. For example, the fluid sampled may consist of a mixture of immiscible liquids, such as oil and water, and the sampler may, by reason of its construction or the location in which it is placed, remove samples containing these liquids in proportions differing from those in which they exist in the flowing stream. Further, if atmospheric temperature drops and the liquid thickens, which particularly happens in oil field installations, the samplers may take a smaller sample than when the liquid is at a higher temperature and lower viscosity.

It is an object of this invention to provide an accurate and dependable sampler of simple construction which has a positive and invariant sampling action. Another object of this invention is to provide a sampler which may be depended upon to remove exactly the same quantity of liquid at each samplying cycle regardless of the composition or the viscosity of the liquid being sampled, the rate of flow in the conduit, or the frequency with which the sampling cycle recurs.

The invention is best described with reference to the drawings, of which:

FIGURE 1 is a front elevation sectional view of a sampling device in accordance with this invention.

FIGURE 2 is a fragmentary sectional view showing a modification of the structure of the device of FIGURE 1.

FIGURE 3 is a front elevation sectional view of an alternate embodiment of this invention.

Referring to FIGURE 1, sampler 10 is supported in operating position in T fitting 12, which is a component of a pipeline system. The direction of fluid flow is as indicated by the arrows 14. The sampler 10 includes a piston housing 16 which derives support from T fitting 12 at the threaded juncture 18, and mates with fitting 12 in fluid tight relationship therewith. Piston housing 16 includes a projecting tubular portion 20 adapted to extend into the flowing stream to be sampled. The projecting end 22 of the tubular portion 20 is sealed by threaded plug 24. A plurality of ports 26 extend circumferentially around tubular portion 20, and communicate with the enclosure 28 defined by the interior walls of tubular portion 20, plug 24, and piston 30. Piston 30 is slidably supported by the interior surfaces of tubular portion 20 and by sealing plug 32. A portion of the interior of piston housing 16 is of enlarged diameter, at 34, to produce an annular enclosure 36 defined by the piston housing, the periphery of the piston 30, and the plug 32. A passageway 38 extends from the head 40 of the piston to that portion of the piston periphery which in part defines the enclosure 36; and this passageway communicates enclosure 28 and enclosure 36. A check valve assembly 42 is provided to prevent flow through passageway 38 towards enclosure 28, but to permit flow in the opposite direction. A second passageway 44 communicates the enclosure 36 with sample outlet pipe 46 and the exterior of the piston housing 16. A check valve 48 is preferably provided to permit fluid flow toward the sample outlet pipe while preventing fluid flow in the reverse direction. Passageway 50 and test screw 52 may be provided to serve their usual function.

Solenoid housing 54 derives support from piston housing 16 and in turn supports solenoid coil 56, through which extends solenoid plunger 58, which includes a head portion 60, and a threaded shaft portion 62 which connects with mating threads in piston 30. Spring 64 yieldably urges solenoid plunger 58 to the retracted position shown. The stroke of the solenoid plunger 58 is controlled by the location of head portion 60 and lock nut 66. Return motion of the solenoid plunger is terminated when lock nut 66 strikes the rubber shock absorber 68, and forward motion of the plunger is terminated when the lugs 70 of the plunger head portion 60 strike the end 72 of housing 54.

FIGURE 2 depicts a modification of the structure shown in FIGURE 1, in that the passageway 38 of piston 30 communicates with an enclosure 74 which is nothing more than a keyway formed axially in the piston 30. Passage 76 communicates with the peripheral surface of the piston 30 at 78 when the piston is in the retracted position. When the piston is in an advanced position, passage 76 communicates with the enclosure 74. The length of the piston is preferably such that the piston-head 40 passes the ports 26 at about the same instant that passage 76 comes into communication with enclosure 74, as the piston advances.

In operation, the flow of fluid through the bend of T fitting 12 produces a zone of turbulence surrounding the projecting tubular portion of the fluid sampler. This turbulence tends to destroy heterogeneities in the fluid ssytem. The solenoid is actuated by means not shown, which may comprise an electric switch periodically operated by a fluid metering device. Thus the sample will be taken per unit of fluid flow. Alternatively, the solenoid may be actuated by a timing mechanism, in which case the samples will be taken upon the basis of time interval, rather than fluid flow.

The solenoid plunger 58 drives the piston 30 forward in the piston housing, and when the head 40 of the piston passes ports 26, the fluid trapped in enclosure 28 is compressed and check valve 42 opens permitting the flow of this trapped fluid through passageway 38 into enclosure 36, and then through passageway 44, check valve 48, sample outlet 46 and into a sample vessel. When the solenoid plunger has reached the full extent of its stroke, that is, when lugs 70 of the plunger head strike end plate 72 of housing 54, further travel of piston 30 ceases, and check valve assembly 42 returns to its normally closed position. When the solenoid is de-energized, spring 64 returns solenoid plunger 58 and piston 30 to the retracted position. The spring 64 should be strong enough to overcome the force of a partial vacuum produced in space 28 as the piston is retracted. As piston head 40 passes ports 26, the suction effect of the partial vacuum in enclosure 28, produced by retraction of piston 30, causes enclosure 28 to again become filled with fluid. The apparatus is then ready for a second cycle.

In the embodiment shown in FIGURE 2, the necessity for check valve assembly 48 has been avoided. It is evident that chamber 74 communicates with passage 76 only after piston 30 has advanced slightly from its fully retracted position, as shown in FIGURE 2. The location of passage 76, chamber 74, piston head 40, and ports 26 are arranged so that communication between chamber 79 and passage 76 is achieved at about the same instant that piston head 40 passes ports 26 and isolates the fluid trapped in enclosure 28. This system possesses the advantage that unexpected pressure increases in the flowing stream cannot overcome the restraining force of the check valves and cause a flow of fluid through the sampling arrangement and into the sample collecting vessel. It is evident that in the embodiment of FIGURE 2, the sample collecting vessel is always positively isolated from the fluid stream either by the blocking of ports 26 by piston 30, or by the lack of communication between enclosure 74 and passage 76.

Referring to FIGURE 3, the piston housing 80 is formed as an integral part of a chamber 82 formed with two opposite threaded openings 83. Piston housing 80 includes a hollow cylinder 84 which communicates with the interior of chamber 82 through port 86. Hollow cylinder 84 passes centrally through chamber 82. The piston housing 80 includes an enlarged hollow portion 88 which supports solenoid housing 90. The piston 92 is formed integrally with the solenoid plunger, and includes a flange 94. Spring 96 is disposed coaxially with the piston and within the enlarged hollow portion 88 of the piston housing. Spring 96 presses upward against flange 94, and downward against the bottom of the hollow enlargement 88. Thus the integral piston-plunger 92 is urged to its normal upward position. The head 98 of piston 92 terminates just above port 86, so as to permit free passage of fluid through the port. The piston 92 must slide freely with a good fit within hollow cylinder 84. A check valve assembly 100 is placed in the opposite end of cylinder 84 from the piston housing 80, and permits flow from within cylinder 84 to sample outlet 102, but prevents flow in the opposite direction.

The operation of the apparatus at FIGURE 3 is very similar to that of the embodiment shown in FIGURE 1. When the solenoid is energized, piston 92 travels downward and piston head 98 closes port 86, trapping fluid within the lower portion of cylinder 84. Further movement of the piston 92 forces the fluid sample downward through check valve assembly 100 and out of the sample outlet 102. When the solenoid has reached the bottom of its stroke, check valve 100 closes preventing the flow of fluid therethrough in the reverse direction. When the solenoid is de-energized, spring 96 returns piston 92 to its normal retracted position. As piston head 98 again passes port 86, the partial vacuum produced in the lower portion of cylinder 84 is effective to suck fluid through port 86 to again fill the lower portion of the cylinder.

The embodiments of the invention in which a special property or privilege are claimed are defined as follows:

1. A device for sampling fluids in a receptacle comprising a piston housing including a closed-ended tubular portion projecting therefrom, said housing being adapted to mate with an opening in said receptacle so that said tubular portion projects thereinto, a piston slidably supported within said housing having advanced and retracted positions and cooperating with the interior of said tubular portion to form a first cylinder-like enclosure, said piston and piston housing being shaped to form a second enclosure extending therebetween for an axial distance substantially equal to the distance between said advanced and retracted positions of said piston, a port communicating said first enclosure and the exterior of said tubular portion at a point intermediate said advanced and retracted positions of the head of said piston, a passage in said piston communicating said enclosures, a check-valve in said passage for preventing flow toward said first enclosure, a second passage communicating said second enclosure and the exterior of said housing, and means for reciprocating said piston.

2. An apparatus according to claim 1 in which said means includes a solenoid.

3. An apparatus according to claim 1 in which said port, second enclosure, and first passage, are located such that when said piston is in the retracted position, the second enclosure communicating terminus of said first passage lies out of communication with said second passage, and the distance of advance of said piston required to communicate said first and second passages through said second enclosure is about equal to the distance of advance of said piston head to close said port.

4. In a fluid sampling device, a conduit for carrying fluid to be sampled, an open-ended tube attached to and extending through said conduit, a solenoid supported exteriorly of said conduit in alinement with one end of said tube, said solenoid having a plunger which extends slidably within said tube to form a piston, means yieldably retaining said plunger in a retracted position with respect to said tube, a check-valve in said tube adjacent the other end thereof to prevent flow inward from said other end, and a port communicating the interior of said conduit with the interior of said tube at a point which lies between said piston and check-valve when said piston is in said retracted position.

5. An apparatus according to claim 4 in which said means comprises a coil spring encompassing said plunger and lying between said solenoid and said conduit, said plunger include a flange portion extending radially therefrom, said flange lying between said solenoid and said conduit, one end of said spring bearing against said flange, and the other end of said spring bearing against said conduit.

6. An apparatus in accordance with claim 1 in which said port, second enclosure, and second passage are located such that when said piston is in the retracted position, the second enclosure communicating terminus of said second passage lies out of communication with said first passage, and the distance of advance of said piston required to communicate said first and second passages through said second enclosure is about equal to the distance of advance of said piston head to close said port.

7. A fluid sampling device comprising a cylinder closed at one end, a piston mounted to slide snugly therein, a fluid chamber adjoining said cylinder, a port connecting said fluid chamber with the interior of said cylinder at a point intermediate the piston head when in fully retracted position and the closed cylinder end, a fluid outlet connected to a passageway communicating with the space defined by said piston and cylinder, valve means positively responsive to the position of said piston for permitting flow of fluid through said passageway when said piston blocks said port and for preventing flow through said passageway when said port is open.

8. A device in accordance with claim 7 in which said means for reciprocating said piston comprises a solenoid connected thereto.

References Cited in the file of this patent

UNITED STATES PATENTS

| | | |
|---|---|---|
| 1,341,898 | Gendar | June 1, 1920 |
| 2,286,888 | Arnold | June 16, 1942 |
| 2,986,940 | Russell | June 6, 1961 |